US006446086B1

(12) United States Patent
Bartlett et al.

(10) Patent No.: US 6,446,086 B1
(45) Date of Patent: Sep. 3, 2002

(54) SYSTEM AND METHOD FOR LOGGING TRANSACTION RECORDS IN A COMPUTER SYSTEM

(75) Inventors: James Bartlett, Arlington; John Kerulis, Little Elm, both of TX (US); Robert Ngan, Chicago, IL (US); Jay Rasmussen, Coppell; Brian Rittenhouse, Frisco, both of TX (US)

(73) Assignee: Computer Sciences Corporation, Austin, TX (US)

( * ) Notice: Subject to any disclaimer, the term of this patent is extended or adjusted under 35 U.S.C. 154(b) by 0 days.

(21) Appl. No.: 09/345,699

(22) Filed: Jun. 30, 1999

(51) Int. Cl.[7] ............................................. G06F 17/30
(52) U.S. Cl. ...................................................... 707/200
(58) Field of Search ............................ 707/6, 101, 200, 707/202, 513; 709/101, 201, 203, 217, 224, 250, 315; 705/1, 8, 31, 34, 35, 39, 40, 48, 59, 64, 76, 77, 79

(56) References Cited

U.S. PATENT DOCUMENTS

| | | | |
|---|---|---|---|
| 5,201,044 A | * 4/1993 | Frey, Jr. et al. | 395/575 |
| 5,386,566 A | 1/1995 | Hamanaka | 709/310 |
| 5,394,555 A | 2/1995 | Hunter et al. | 711/148 |
| 5,434,994 A | 7/1995 | Shaheen et al. | 709/223 |
| 5,586,310 A | 12/1996 | Sharman | 707/10 |
| 5,689,706 A | 11/1997 | Rao et al. | 707/201 |
| 6,049,665 A | 4/2000 | Branson et al. | 717/108 |

FOREIGN PATENT DOCUMENTS

EP   0926 608   6/1999

* cited by examiner

Primary Examiner—Diane D. Mizrahi
Assistant Examiner—Apu M Mofiz
(74) Attorney, Agent, or Firm—Eric B. Meyertons; Conley, Rose & Tayon, P.C

(57) ABSTRACT

An improved method and system for logging transaction records in a computer system. The method may include writing a confirmation log record to the log file for a transaction that completes normally, and not writing a confirmation log record for transactions that are aborted. The log file may be unloaded periodically by an unload program. The unload program may write transaction log records accompanied by a confirmation log record to a good output file and transaction log records not accompanied by a confirmation log record to a suspended output file. On a subsequent execution, the unload program may combine the log records in the log file and the suspended file. The unload program may write transaction log records accompanied by a confirmation log record to a good output file. The unload program may write transaction log records not accompanied by a confirmation log record and which have not exceeded a transaction time limit to a suspended output file. The unload program may write transaction log records not accompanied by a confirmation log record and which have exceeded a transaction time limit to a disposal output file. The transaction log records in the good output file may then be processed normally by log processing programs.

43 Claims, 8 Drawing Sheets

SYSTEM AND METHOD FOR LOGGING TRANSACTION RECORDS IN A COMPUTER SYSTEM

BACKGROUND OF THE INVENTION

1. Field of the Invention

The present invention generally relates to the logging of transaction records in a computer system. More particularly, the present invention relates to the logging of transaction records in large-scale transaction-based computer application programs.

2. Description of the Related Art

In a transaction-based computer program, it is often advantageous to record the steps in a transaction in records, and to write the records to a file on non-volatile storage. The process of generating the records and writing them to a file may be commonly called logging, event logging, or transaction logging. The file on non-volatile storage may be commonly called a log file. The records are commonly written to the log file as soon as they are created. As used herein, a "transaction" is a series of instructions executed by a computer system for carrying out a financial operation. A transaction may include multiple steps, and each step may produce one or more records written to the log file. Examples of transactions include, but are not limited to, financial transactions such as deposits, withdrawals, and finds transfers between accounts. Examples of the contents of records in a transaction include, but are not limited to, account numbers, deposit amounts, account balances, interest rates and calculations. In addition, each record may include the time the transaction began, and the time the record was generated. Other fields may be included in a record. The fields may include, but are not limited to, a field indicating which program or program module generated the record, and a field indicating which business unit initiated the transaction. As used herein, a "log file" may include information relating to transactions which is stored in memory and which may be structured into fields, records, and/or other suitable data structures.

It may be necessary to periodically unload transaction log records from a log file. One reason for the periodic unloading is that transaction log files may grow rapidly, especially in a large-scale transaction-based application where applications on several servers may be writing records to the log files, so it may be necessary to reduce the size of the log files. Another reason for the periodic unloading is that the transaction log records may require periodic processing for business purposes, such as for account balancing in a financial application. The log file unloading may occur at periodic intervals ranging from every few minutes to every few days. As used herein, a "logger unload program" is a computer program that unloads information relating to transactions from a log file.

A demand for processing performance and scalability greater than that provided by single- and multi-processor systems led to the development of clusters. In general, a cluster is a group of servers that may share resources and cooperate in processing. One type of cluster is the single-system image cluster. The servers in a single-system image cluster appear as one logical system to clients and to application programs running on the cluster, hence the name "single-system." Single-system image clusters typically share external, non-volatile data storage, such as disk drives. Databases and other types of data permanently reside on the external storage. The servers, however, do not generally share volatile memory. Each server in the cluster operates in a dedicated local memory space. Copies of a program may run concurrently on several servers in the cluster. The workload may be dynamically distributed among the servers. The copies of the programs may appear as one logical program to the client. All servers in the cluster have access to all of the data stored in external storage, and a program running on any server in the cluster may run any transaction.

The single-system image cluster solves the availability and scalability problems and adds a level of stability by the use of redundant systems with no single points of failure. Effectively, the one logical system may be available year-round to clients and application programs without any outages. Hardware and software maintenance and upgrades may be performed without the loss of availability of the cluster and with little or no impact to active programs. The combination of availability, scalability, processing capability, and the logical system image make the single-system image cluster a powerful environment on which to base a large-scale transaction-based enterprise server.

A single-system image cluster may include at least one Coupling Facility (CF) which provides hardware and software support for the cluster's data sharing functions. The single-system image cluster may also provide a timer facility to maintain time synchronization among the servers. On such a system, several operating system images such as MVS images may be running on at least one computer system. MVS and OS/390 are examples of mainframe operating systems. OS/390 is a newer version of the MVS operating system, and the terms OS/390 and MVS are used interchangeably herein. "MVS image" is used synonymously with "server" herein. Operating systems other than MVS may also run as servers on a single-system image cluster. Each server is allocated its own local memory space. The servers appear as one logical server to a client. Programs may be duplicated in the memory space of several servers. The workload of a program may be divided among several copies of the program running on different servers. As in the case with the multiple servers appearing as one logical server, multiple copies of a program running on a single-system image cluster may appear as one logical program to the client. Mainframe operating systems often include a logging utility to provide a common, centralized logging function to programs running on a computer system.

A common event in a transaction-based computer program is the aborting of a transaction. As used herein, "aborting" includes terminating a transaction before all of the steps of the transaction have been executed. If transactions are being logged, several log records for the transaction may have been stored in a log file at the time of the abort. Leaving the log records for an aborted transaction in a log file may cause problems in the processing of the transactions after they are unloaded from the log file. For example, in a banking application, a bank may attempt to transfer funds from one account to another through an intermediate account. The transaction may first withdraw the funds from a first account generating a log record, put the funds in the second account generating a log record, and then attempt to transfer the funds to the third account. Finding the third account closed, the desired action may be to abort the entire transaction and leave the funds in the first account. The existence of a withdrawal log record and a deposit log record for an aborted transaction in the log file may be problematic for programs processing transaction log records from a log file.

It is therefore desirable to provide a method for indicating a completion status for a transaction in transaction log records written to a log file for a large-scale transaction-based application. It is also desirable to provide a method for distinguishing between aborted and successfully completed transactions as the log records are processed.

Logging utilities provided by operating systems, such as MVS Logger and OS/390 logger, typically do not provide a method for indicating a completion status for transactions, and thus do not fully support transaction logging as described herein. The system-provided loggers do provide a common, centralized logging function with many useful features. It is therefore desirable that a method for indicating a completion status for a transaction in transaction log records written to a log file be applicable to logging utilities provided by operating systems, such as MVS Logger and OS/390 Logger.

The problem of aborted transactions may also occur in computer systems in general where a program or programs log transactions or events to log files. Therefore, a solution to the aborted transaction problem should preferably be applicable to computer programs in general as well as specifically to large-scale transaction-based applications.

SUMMARY OF THE INVENTION

The present invention provides various embodiments of an improved method and system for logging transaction records in a computer system. In one embodiment, the method may include writing a confirmation log record to the log file for a transaction that completes normally, and not writing a confirmation log record for transactions that are aborted. The log file may be unloaded periodically by an unload program. The unload program may write transaction log records accompanied by a confirmation log record to a good output file and transaction log records not accompanied by a confirmation log record to a suspended output file. On a subsequent execution, the unload program may combine the log records in the log file and the suspended file. The unload program may write transaction log records accompanied by a confirmation log record to a good output file. The unload program may write transaction log records not accompanied by a confirmation log record and which have not exceeded a transaction time limit to a suspended output file. The unload program may write transaction log records not accompanied by a confirmation log record and which have exceeded a transaction time limit to a disposal output file. The transaction log records in the good output file may then be processed normally by log processing programs.

In one embodiment, a transaction-based application program (hereinafter referred to as "the program") running on a server, may start a first transaction, and the first transaction may create a first transaction log record. The first transaction may also create a second transaction log record. The generated first and second transaction log records may be written to a log file immediately. In one embodiment, more than one program may be running on a server, the programs may be running transactions, and the transactions may be writing log records to a log file.

At some point, the program completes the first transaction. The program may generate a transaction confirmation log record for the first transaction and write the confirmation log record to the log file. The program may then start a second transaction. The second transaction may generate a first transaction log record and a second transaction log record, and the transaction log records may be written to the log file. The program may also start a third transaction, and the third transaction may generate a first transaction log record and the transaction log record may be written to the log file.

Periodically, an unload program unloads the log file. The unload program may collect all of a transaction's log records from the log file and examine the records to see if a transaction confirmation log record exists for the transaction. The unload program may examine the first transaction log records, find the log records for the first transaction, and also find the transaction confirmation log record generated for the first transaction. The unload program may write the first transaction log records to an output file for completed transaction log records. The unload program may also examine the second transaction log records, finding the log records generated so far for the second transaction, but not finding a transaction confirmation log record for the second transaction. The unload program may write the second transaction log records to a suspended file for uncompleted transaction log records. The unload program may also examine the third transaction log records, finding the log record generated so far for the third transaction, but not finding a transaction confirmation log record for the third transaction. The unload program may write the third transaction log records to a suspended file for uncompleted transaction log records. At this point, the unload of the log file has completed.

At some point, the program completes the second transaction. The program may generate a transaction confirmation log record for the second transaction and write it to the log file. The third transaction may generate a second transaction log record and write it to the log file.

At some point, the unload program begins the periodic unloading of the entries made in the log file since the last unload, and the entries made in the suspended file during the last unload. The unload program may collect all of a transaction's log records from the log file and the suspended file and examine the records to see if a transaction confirmation log record exists for the transaction. The unload program may examine the second transaction log records, finding the log records generated for the second transaction, and also finding the transaction confirmation log record generated for the second program. The unload program may write the second transaction log records to the output file for completed transaction log records. The unload program may also examine the third transaction log records, find the log records generated so far for the third transaction, but not find a transaction confirmation log record for the third transaction.

The unload program may further examine transaction log records that do not include a transaction confirmation log record. The unload program may examine the time stamp for the transaction log records. The time stamp may be the start time of the transaction that created the transaction log records. The unload program may calculate the elapsed time of a transaction by subtracting the start time of the transaction from the current system time read from a system clock. The calculated elapsed time of the transaction may be compared to a transaction time limit.

The unload program may examine the third transaction log records, calculate the elapsed time of the third transaction, and compare the elapsed time to a transaction time limit. The unload program may assume that transaction log records that do not have an accompanying confirmation log record, and for which the transaction elapsed time has exceeded the transaction time limit, are transaction log records for a transaction that has been aborted. Aborted transaction log records are written to a transaction log record disposal file. Finding that the third transaction has not exceeded the transaction time limit, the unload program may write the third transaction log records to a suspended file for uncompleted transaction log records. At this point the unload of the log file and suspended file has completed.

At some point, the program aborts the third transaction. Significantly, no transaction confirmation log record is written for the third transaction.

At some point, the unload program begins the periodic unloading of the entries made in the log file since the last unload, and the entries made in the suspended file during previous unloads. The unload program may collect all of a transaction's log records from the log file and the suspended file and examine the records to see if a transaction confirmation log record exists for the transaction. The unload program may examine a transaction's log records and find a transaction confirmation log record. The unload program may write the transaction log records to the output file for completed transaction log records. The unload program may also examine the third transaction log records, find the log record generated for the third transaction that were in the suspended file, but not find a transaction confirmation log record for the third transaction.

The unload program may further examine transaction log records that do not include a transaction confirmation log record. The unload program may examine the third transaction log records, calculate the elapsed time of the third transaction, and compare the elapsed time to a transaction time limit. The unload program may assume that transaction log records that do not have an accompanying confirmation log record, and for which the transaction elapsed time has exceeded the transaction time limit, are transaction log records for a transaction that has been aborted. Finding that the third transaction has exceeded the transaction time limit, the unload program may write the third transaction log records to a disposal file for aborted transaction log records. The unload program may write the transaction log records of transactions that have not exceeded the transaction time limit to a suspended file for uncompleted transaction log records. At this point the unload of the log file and suspended file has completed.

One advantage of the method described herein, including writing a confirmation log record for a successfully completed transaction and not writing a confirmation log record for an aborted transaction, is that the confirmation log record provides positive evidence that a transaction has successfully completed during processing of a log file. Another advantage is that the method may be used with logger utilities provided with operating systems, such as MVS Logger and OS/390 Logger. Yet another advantage is that the method may be applied in computer systems in general where programs perform event logging.

BRIEF DESCRIPTION OF THE DRAWINGS

FIG. 7b is a continuation of flowchart 7a;

Figure 1:
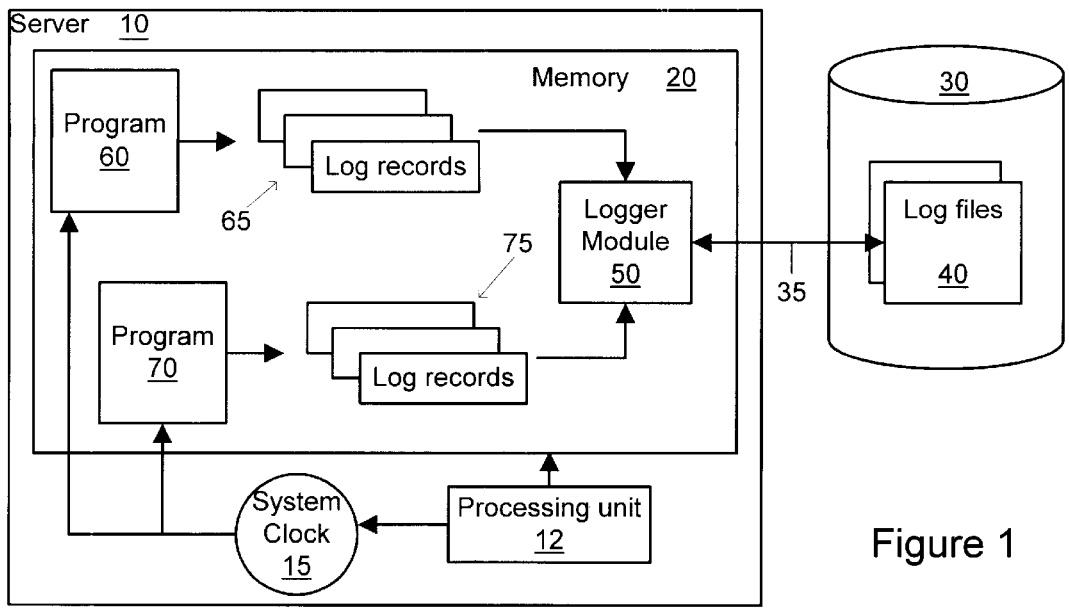
FIG. 1 illustrates a server in which programs send log records to a logger module.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE DRAWINGS

The term "computer system" as used herein generally describes the hardware and software components that in combination allow the execution of computer programs. The computer programs may be stored in software, hardware, or a combination or software and hardware. A computer system's hardware generally includes a processor, memory media, and Input/Output (I/O) devices. As used herein, the term "processor" or "processing unit" generally describes the logic circuitry that responds to and processes the basic instructions that operate a computer system. The term "memory medium" includes an installation medium, e.g., a CD-ROM, or floppy disks; a volatile computer system memory such as DRAM, SRAM, EDO RAM, Rambus RAM, etc.; or a non-volatile memory such as optical storage or a magnetic medium, e.g., a hard drive. The memory medium may comprise other types of memory or combinations thereof In addition, the memory medium may be located in a first computer in which the programs are executed, or may be located in a second computer connected to the first computer over a network. The term "memory" is used synonymously with "memory medium" herein. A computer system also generally includes a system clock to provide the current time to programs.

A computer system's software generally includes at least one operating system, a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as required by a program. Some operating systems may include a logging utility to provide a common, centralized logging function to programs running on a computer system.

A computer system may comprise more than one operating system. When there is more than one operating system, resources such as volatile and non-volatile memory, installation media, and processor time may be shared among the operating systems, or specific resources may be exclusively assigned to an operating system. For example, each operating system may be exclusively allocated a region of volatile memory. The region of volatile memory may be referred to as a "partition" or "memory space." A combination of an operating system and assigned or shared resources on a computer system may be referred to as a "server." A computer system thus may include one or more servers.

FIG. 1—A Server in Which Programs Send Log Records to a Logger Module

FIG. 1 illustrates a server 10 including a system memory 20 connected to a data storage 30 by a data bus 35, a system clock 15, and a processing unit 12 connected to system memory 20 and system clock 15. Processing unit 12 may include a single processor or several processors performing in parallel. Processing unit may be coupled to data storage 30 by a data bus. A log file 40 may be stored on the data storage 30 and may be maintained by logger module 50. A program 60 and a program 70, running on server 10, may run transactions that generate transaction log records 65 and 75. Program 60 and program 70 may send the log records to logger module 50, which then may write the transaction log records to log files 40. Programs 60 and 70 do not send a transaction log record indicating the end of a transaction to logger module 50. The system clock 15 may be used in generating the current time and/or creating time stamps for log records. As used herein, a "time stamp" is a record of the time at which part of a log file was written or a record of the time at which a transaction or a step in a transaction was generated.

Figure 2:
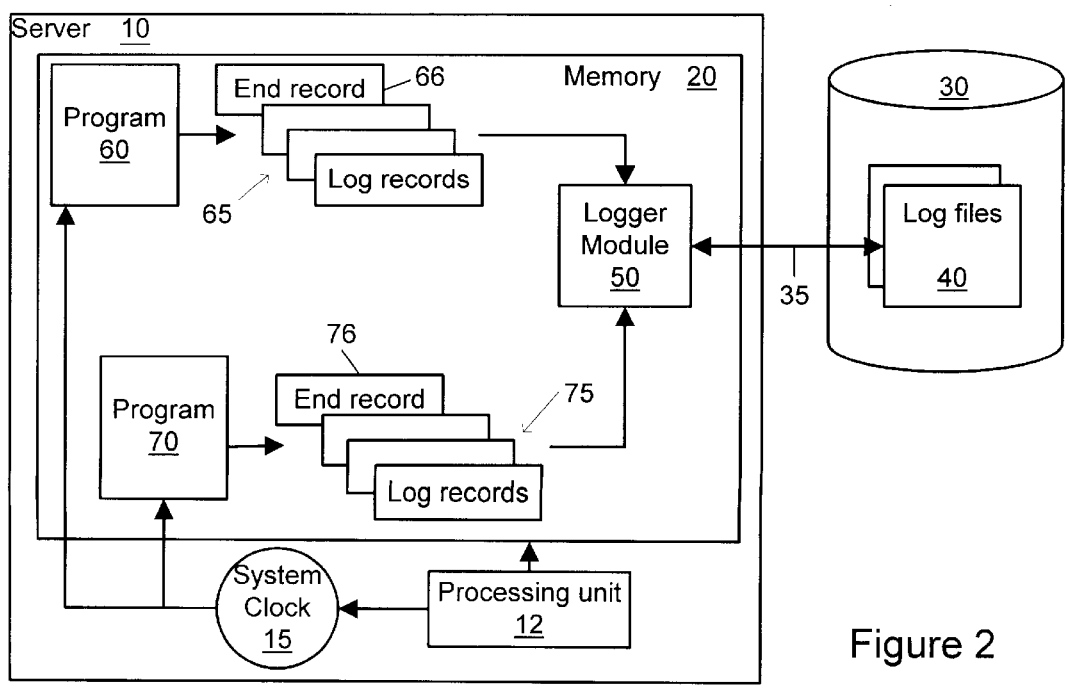
FIG. 2 illustrates a server with programs sending log records with end records to a logger module according to one embodiment.

FIG. 2—A Server with Programs Sending Log Records with End Records to a Logger Module According to One Embodiment FIG. 2 illustrates a server 10 including a system memory 20 connected to a data storage 30 by a data bus 35, a system clock 15, and a processing unit 12 connected to system memory 20 and system clock 15. Processing unit 12 may include a single processor or several processors performing in parallel. Processing unit may be coupled to data storage 30 by a data bus. A log file 40 may be stored on the data storage 30 and may be maintained by logger module 50. A program 60 running on server 10 may run a transaction that may generate a set of transaction log records 65. Program 60 may send the log records to logger module 50, which then may write the transaction log records 65 to log files 40. When the transaction generating transaction log records 65 ends in program 60, program 60 generates a transaction end record 66 and sends it to logger module 50. Logger module 50 then may write transaction end record 66 to log files 40. Similarly, a program 70 running on server 10 may run a transaction that may generate a set of transaction log records 75. Program 70 may send the log records to logger module 50, which then may write the transaction log records 75 to log files 40. When the transaction generating transaction log records 75 ends in program 60, program 60 generates a transaction end record 76 and sends it to logger module 50. Logger module 50 then may write transaction end record 76 to log files 40. The system clock 15 may be used in generating the current time and/or creating time stamps for log records.

Figure 3:
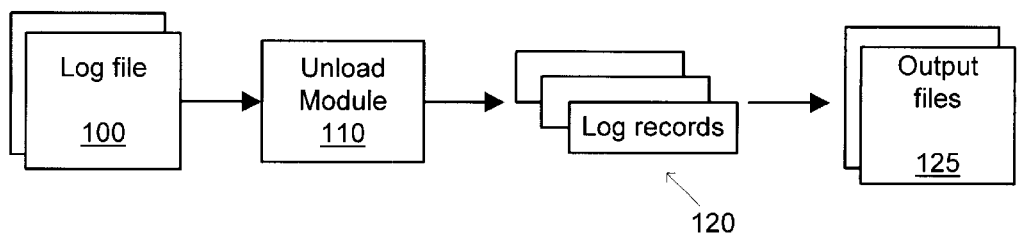
FIG. 3 illustrates a process of an unload module moving records from a log file to an output file.

FIG. 3—A Process of an Unload Module Moving Records From a Log File to an Output File FIG. 3 illustrates an unload module 110 extracting transaction log records 120 from a log file 100 and moving them to an output file 125. Note that the unload module 110 has no mechanism for determining if transaction log records 120 is complete, so all of transaction log records 120 are moved into output files 125

Figure 4:
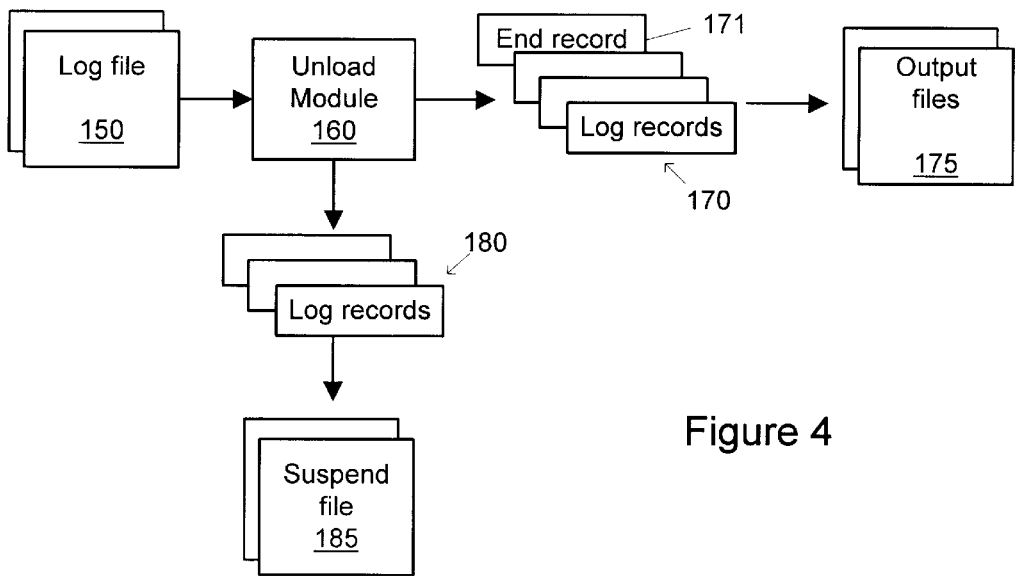
FIG. 4 illustrates an unload module reading a log file and moving records with end records to an output file and records without end records to a suspend file according to one embodiment.

FIG. 4—An Unload Module Reading a Log File and Moving Records with End Records to an Output File and Records Without End Records to a Suspend File According to One Embodiment FIG. 4 illustrates an unload module 160 extracting transaction log records from a log file 150 and sorting the transaction log records based upon the presence of a transaction end record. Unload module 160 comprises a logger unload program. Unload module 160 may perform periodic unloading of log files on a computer system. At the time unload module 160 performs the unload of the records from log file 150, a transaction generating transaction log records 170 may have completed. A transaction end record 171 may have been generated in response to the completion of the transaction and written to the log file. A "transaction end record" is used herein as a synonym for a "completion record," i.e., a sequence of characters or binary data indicating that a transaction has completed. Unload module 160 may read one or more transaction records 170 from log file 150. Unload module 160 may then detect the transaction end record 171 and write the transaction records 170 to an output file 175 in response to detecting the transaction end record 171. In one embodiment, an unload module may dispose of a transaction end record after the transaction end record is used. In another embodiment, an unload module may send a transaction end record to an output file with the rest of the transaction records.

Unload module 160 also may read one or more transaction records 180 from log file 150. When all records in the log file 100 have been processed by unload module 160 and no transaction end record is found for transaction records 180, unload module 160 may write transaction records 180 to a suspend file 185.

Figure 5:
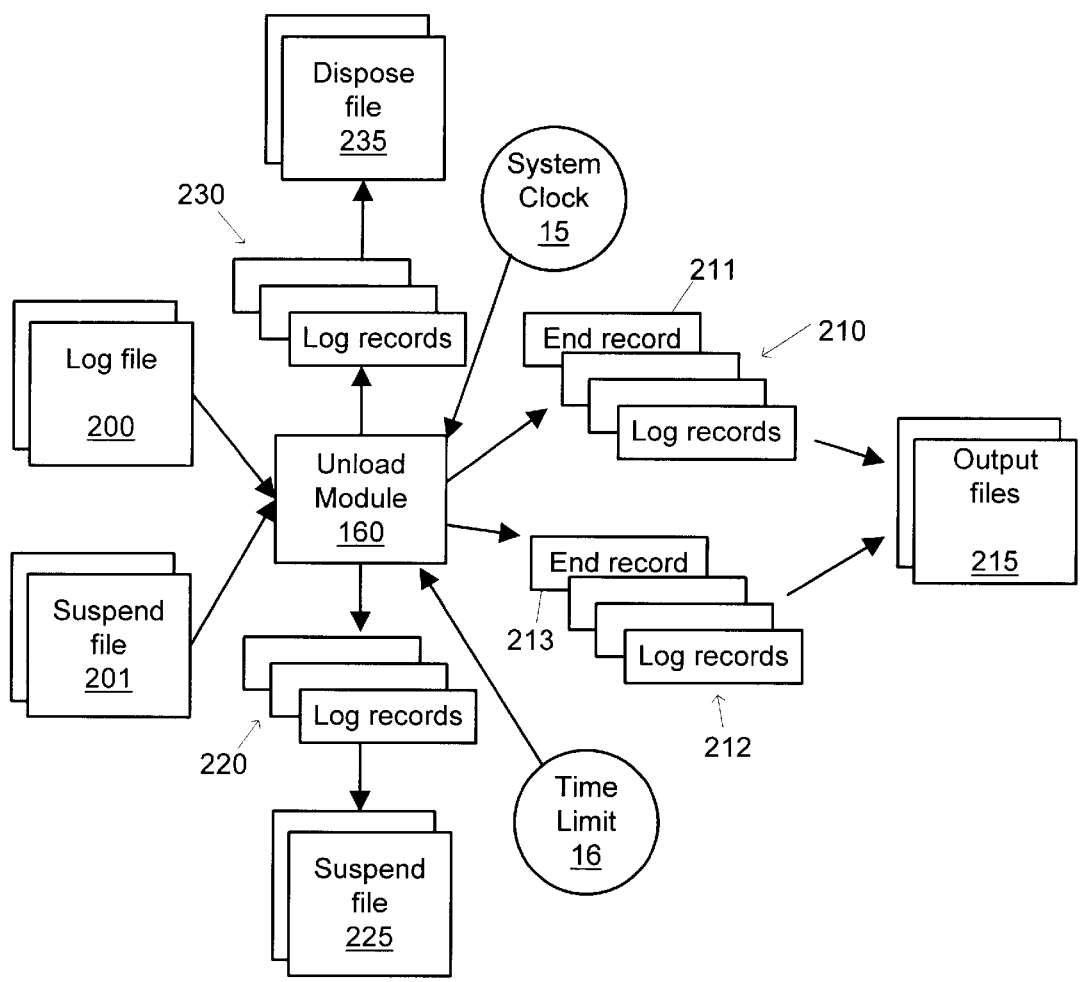
FIG. 5 illustrates an unload module reading a log file and a suspend file and moving records with end records to an output file, records without end records to a suspend file, and timed-out records to a dispose file according to one embodiment.

FIG. 5—An Unload Module Reading a Log File and a Suspend File and Moving Records with End Records to an Output File, Records without End Records to a Suspend File, and Timed-out Records to a Dispose File According to One Embodiment FIG. 5 illustrates an unload module 160 extracting transaction log records from a log file 200 and a suspend file 201 and sorting the transaction log records based upon the presence of a transaction end record and a time limit for incomplete transactions. At the time the unload module 160 performs the unload of the transaction log records from log file 200 and suspend file 201, a transaction generating transaction log records 210 may have completed. Transaction end record 211 may have been generated and written to log file 200 upon completion of the transaction. Another transaction may have started and written transaction log records 220 to log file 200. Transaction log records 212 and transaction log records 230 may have been written to a suspend file by an earlier unload of a log file by unload module 160. After the earlier unload, additional transaction log records 212 may have been written to log file 200, a transaction generating the transaction log records 212 may have completed, and transaction end record 213 may have been written to log file 200.

Unload module 160 may read one or more transaction records 210 from log file 200. Unload module 160 may then detect the transaction end record 211 and write the transaction records 210 to one of output files 215 in response to detecting the transaction end record 211. In this case, the output file is a completed transaction file. As used herein, a "completed transaction file" may include a file in memory which stores information relating to completed transactions. Output files may also include an uncompleted transaction file and an aborted transaction file. As used herein, an "uncompleted transaction file" may include a file in memory which stores information relating to uncompleted transactions. As used herein, an "aborted transaction file" may include a file in memory which stores information relating to aborted transactions. Unload module 160 may also read one or more transaction records 212 from suspend file 201 and one or more transaction records 212 including transaction end record 213 from log file 200. Unload module 160 may then detect the transaction end record 213 and write the transaction records 212 to one of output files 215 in response to detecting the transaction end record 213.

When all records in the log file 200 have been read by unload module 160, unload module 160 may examine transaction records that have no transaction end record associated with them. No transaction end record is found for transaction records 220 and 230. Unload module 160 may then examine transaction records 220 and determine that the transaction has not exceeded a transaction time limit 16. Unload module 160 may subtract a time stamp in transaction record 220 from the system time read from a system clock 15 to determine the transaction elapsed time. Unload module 160 may then write transaction records 220 to a suspend file 225. Unload module 160 may then examine transaction records 230 and determine that the transaction has exceeded the transaction time limit. Unload module 160 may then write transaction records 230 to a dispose file 235.

Figure 6:
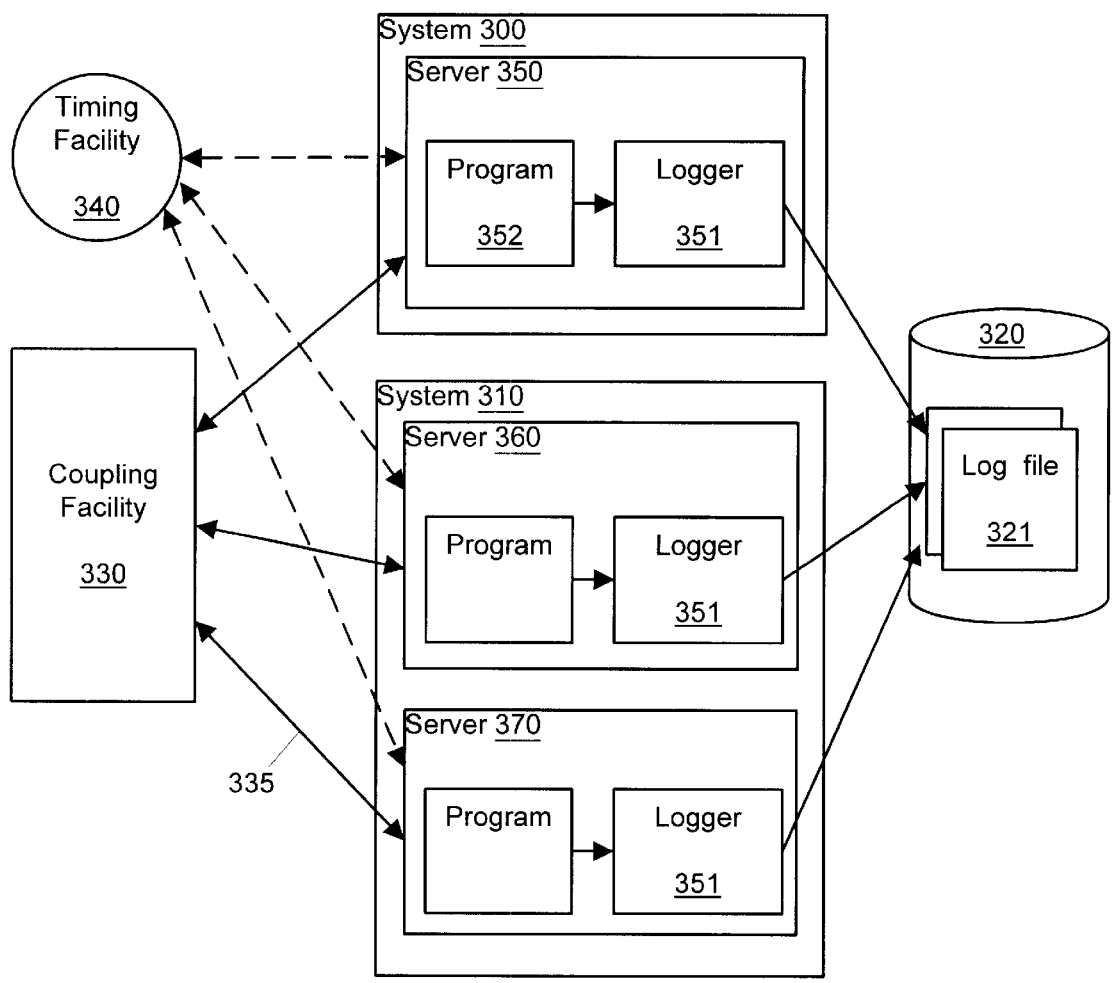
FIG. 6 is a high-level block diagram of a single-system image cluster system.
Figure 7A:
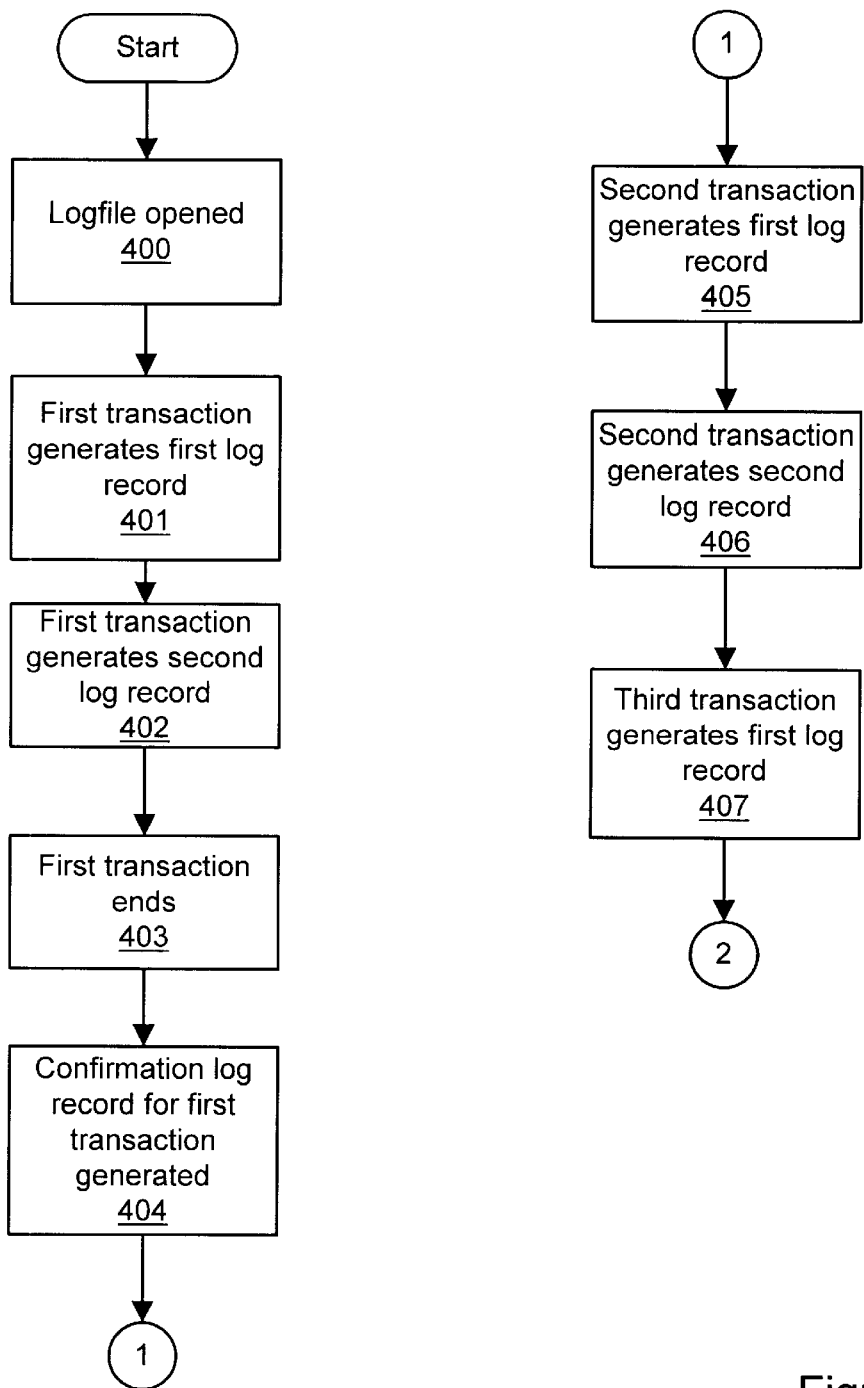
FIG. 7a is a flowchart illustrating a process of sorting transaction logs into different output categories according to one embodiment.
Figure 7B:
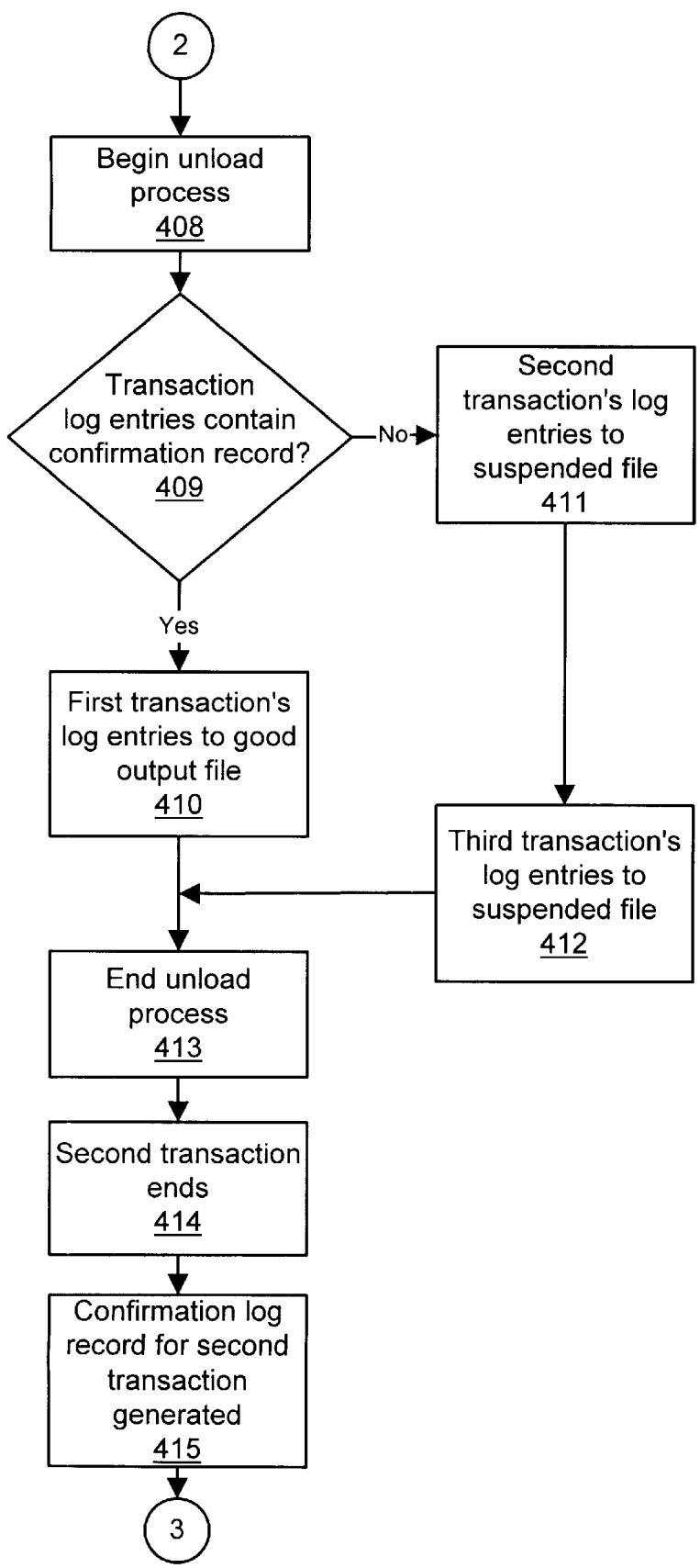
Figure 7C:
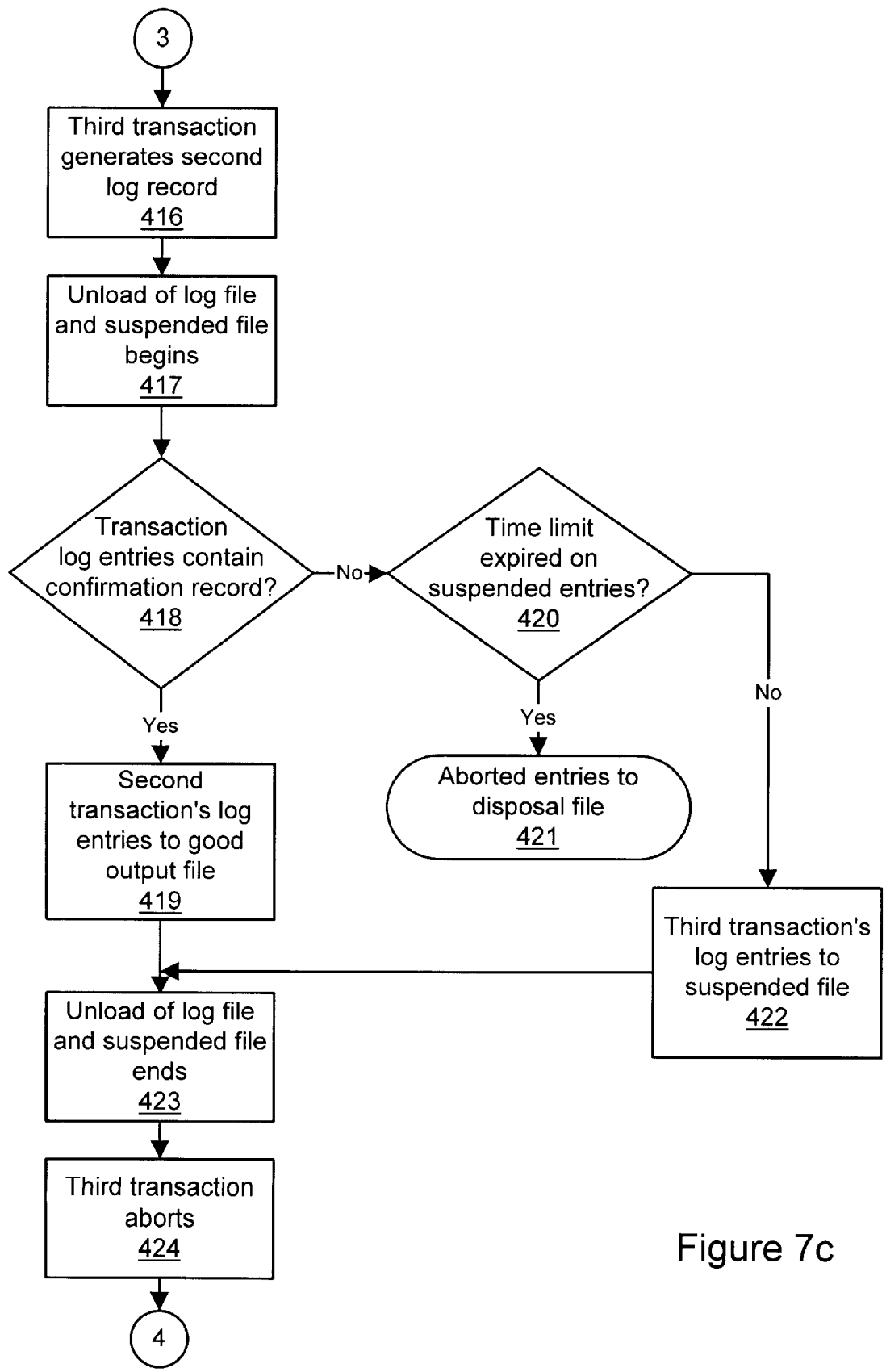
FIG. 7c is a continuation of flowchart 7b.
Figure 7D:
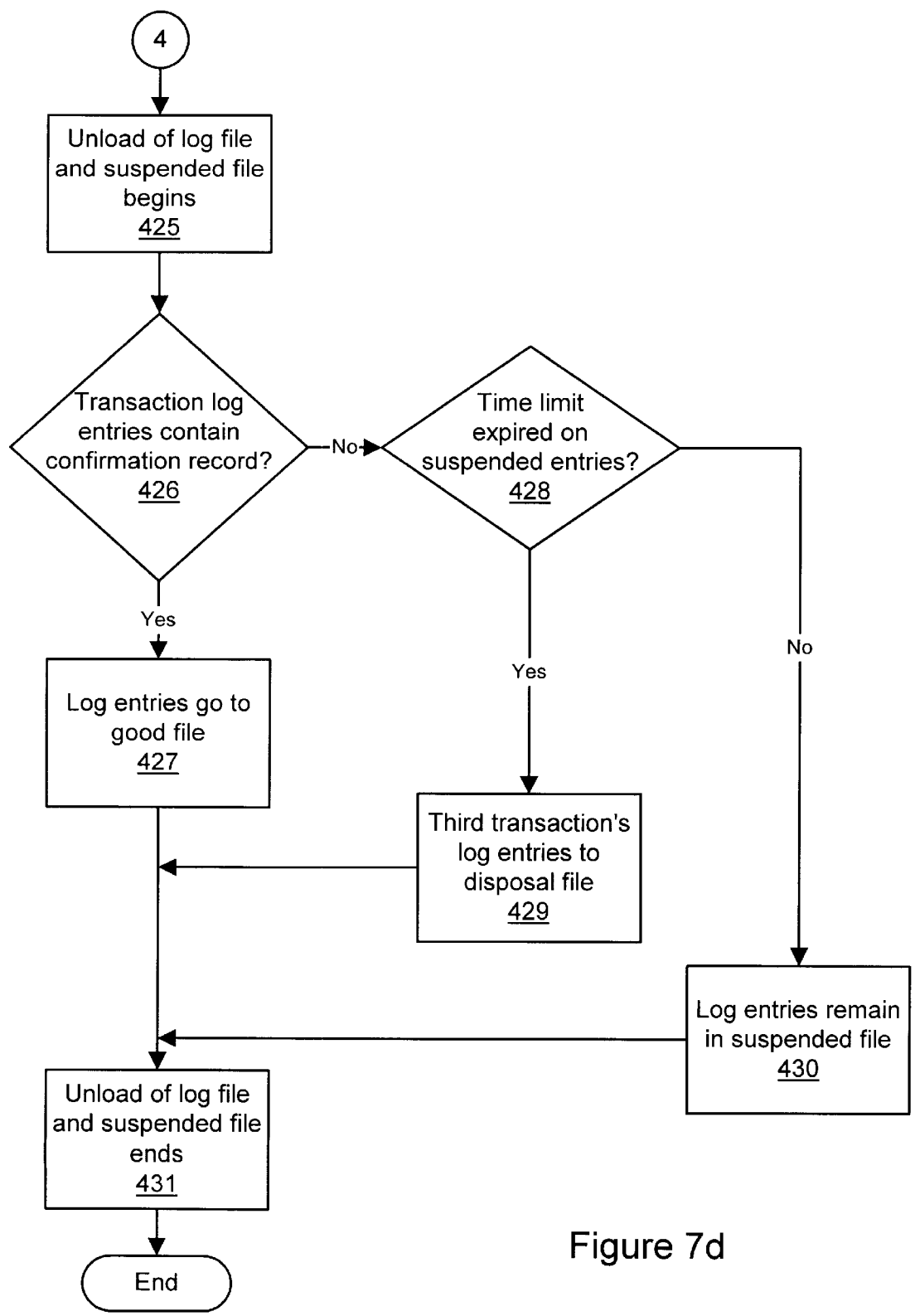
FIG. 7d is a continuation of flowchart 7c.

FIG. 6—A High-level Block Diagram of a Single-system Image Cluster System

FIG. 6 illustrates an embodiment of a single-system image cluster system that is suitable for implementing the logging system and method as described herein. The system may include multiple systems (two systems, systems 300 and 310, are shown) running mainframe operating systems such as OS/390 or MVS operating systems; at least one coupling facility 330 to assist in multisystem data sharing functions, wherein the coupling facility 330 is physically connected to systems in the cluster with high-speed coupling links 335; a timer facility 340 to synchronize time functions among the servers; and various storage and I/O devices 320, such as DASD (Direct Access Storage Devices), tape drives, terminals, and printers, connected to the systems by data buses or other physical communication links.

Shown in system 300 is a server 350 running a mainframe operating system such as MVS. A logger 351 is shown running on server 350. The logger 351 accepts records to be logged from program 352 and writes them to a log file 321 shown on external storage. Also shown in system 310 is a system partitioned into more than one logical system or server (two servers, servers 360 and 370, both running a mainframe operating system such as MVS, are shown on system 310). Servers 360 and 370 may also have programs interfacing with a logger.

The single-system image cluster system provides dynamic workload balancing among the servers in the cluster. To a client working at a terminal or to an application program running on the cluster, the servers and other hardware and software in a single-system image cluster system appear as one logical system.

FIGS. 7a–7d—A Flowchart Illustrating a Process of Sorting Transaction Logs into Different Output Categories According to One Embodiment FIGS. 7a through 7d present a flowchart illustrating one embodiment of a method of transaction logging providing the ability to sort transaction logs into different output categories. The flowchart may describe a logging process similar to that shown in FIG. 2. At step 400, a log file is opened. Opening a log file may include creating a new log file, or it may include opening a previously created log file. In one embodiment, the log file may be created on an external storage device such as a disk drive. In another embodiment, the log file may be created in a volatile memory and later written to a non-volatile storage. In one embodiment, an application program running on a server may create the log file. In another embodiment, a system logging utility may provide log file creation and maintenance to application programs running on the server. In yet another embodiment, a logger interface program may provide log file creation and maintenance to application programs, and may interface to a system logging utility. As used herein, a "logger interface program" includes a program which is configured to accept transactions generated by programs and send the transactions to a system logging utility.

At step 401, a first transaction generates a first transaction log record. At step 402, the first transaction generates a second transaction log record. In this flowchart, generating a transaction log record may include the creation of the transaction log record and writing the transaction log record to a log file. In one embodiment, a program may directly write a transaction log record to a log file. In another embodiment, a program may send a transaction log record to a logging program and the logging program may write the transaction log record to a log file. In yet another embodiment, a program may send a transaction log record to a system logging utility and the system logging utility may write the transaction log record to a log file. In one embodiment, a transaction may include a number of steps, wherein each step in the transaction may generate one or more transaction log records.

In step 403, the first transaction may complete. The program may generate a transaction confirmation log record for the first transaction in step 404. The terms transaction confirmation log record, transaction end record, and transaction completion record are synonymous as used herein. As used herein, a "transaction completion record" may include information, such as a sequence of characters or binary data, indicating that a transaction has completed. A second transaction may generate a first transaction log record in step 405, and a second transaction log record in step 406. In step 407, a third transaction may generate a first transaction log record.

In step 408, an unload program as illustrated in FIG. 6 begins unloading the log file. In step 409, the unload program may collect all of a transaction's log records from the log file and examine the records to see if a transaction confirmation log record exists for the transaction. In step 409, the unload program may examine the first transaction log records, finding the log records generated in steps 401 and 402, and also finding the transaction confirmation log record generated in step 404. The unload program may write the first transaction log records to an output file for completed transaction log records in step 410. In one embodiment, all of a completed transaction's log records may be written to a completed transaction output file. In another embodiment, transaction confirmation log records are deleted after they are used to identify completed transactions and are not written to a completed transaction output file. In step 409, the unload program may also examine the second transaction log records, finding the log records generated in steps 405 and 406, but not finding a transaction confirmation log record. The unload program may write the second transaction log records to a suspended file for uncompleted transaction log records in step 411. In step 409, the unload program may also examine the third transaction log records, finding the log record generated in steps 407, but not finding a transaction confirmation log record. The unload program may write the third transaction log records to a suspended file for uncompleted transaction log records in step 412. In step 413, the unload of the log file is completed.

In step 414, the second transaction may complete. The program may generate a transaction confirmation log record for the second transaction in step 415. In step 416, the third transaction may generate a second transaction log record.

In step 417, the unload program begins unloading the entries made in the log file since the last unload, and the entries made in the suspended file during the last unload. In step 418, the unload program may collect all of a transaction's log records from the log file and the suspended file and examine the records to see if a transaction confirmation log record exists for the transaction. In step 418, the unload program may examine the second transaction log records, finding the log records generated in steps 405 and 406, and also finding the transaction confirmation log record generated in step 415. The unload program may write the second transaction log records to the output file for completed transaction log records in step 419. In step 418, the unload program may also examine the third transaction log records, find the log records generated in steps 407 and 416, but not find a transaction confirmation log record.

In step 420, the unload program may further examine a transaction's log records that do not include a transaction confirmation log record. In one embodiment, a transaction log record may include at least one time stamp. A transaction start time is one example of a time stamp, wherein a transaction start time may indicate the time at which a transaction was generated or written to a log file. In one embodiment of a transaction log record including a time stamp, the time stamp may be represented as a text representation of a year, month, day of the month, hour, minute, seconds, and fractions of seconds. In another embodiment of a transaction log record including a time stamp, the time stamp may be represented as a binary number, and the binary number may represent a number of fractions of a second since a system-determined base time. Other methods of representing a time stamp in a transaction log record will be obvious to one skilled in the art. In one embodiment, a transaction that generates transaction log records may use the start time of the transaction as a time stamp for transaction log records. In one embodiment, a time stamp used by a transaction may be unique for that transaction and may be used to uniquely identify the transaction. In step 420, the unload program may examine the time stamp for the transaction log records. The time stamp may be the start time of the transaction that generated the transaction log records. The unload program may calculate the elapsed time of a transaction by subtracting the start time of the transaction from the current system time read from a system clock (see FIG. 5, item 15). The calculated elapsed time of the transaction may be compared to a transaction time limit (see FIG. 5, item 16). In one embodiment, a transaction time limit for a transaction log record may be read from a program that generated the transaction log record. In another embodiment, a transaction time limit may be set in the unload program. In yet another embodiment, a transaction time limit may be entered by a user of the unload program before transaction log records in a log file and suspended file are processed.

In step 420, the unload program may examine the third transaction log records, calculate the elapsed time of the third transaction, and compare the elapsed time to a transaction time limit. In step 420, the unload program may assume that a transaction having transaction log records that do not have an accompanying confirmation log record, and for which the transaction elapsed time has exceeded the transaction time limit, has been aborted. Aborted transaction log records are written to a transaction log record disposal file in step 421. In one embodiment the disposal log file may be kept after the unload program completes. In another embodiment, the record disposal file is deleted by the unload program before the unload program completes. Finding that the third transaction has not exceeded the transaction time limit, the unload program may write the third transaction log records to a suspended file for uncompleted transaction log records in step 422. In step 423, the unload program finishes the unload of the log file and suspended file.

In step 424, the third transaction is aborted. No transaction confirmation log record is written for the third transaction.

In step 425, the unload program begins unloading the entries made in the log file since the last unload, and the entries made in the suspended file during previous unloads. In step 426, the unload program may collect all of a transaction's log records from the log file and the suspended file and examine the records to see if a transaction confirmation log record exists for the transaction. In step 427, the unload program may examine a transaction's log records and find a transaction confirmation log record. The unload program may write the transaction log records to the output file for completed transaction log records in step 427. In step 426, the unload program may also examine the third transaction log records, find the log record generated in steps 407 and 416, but not find a transaction confirmation log record.

In step 428, the unload program may further examine a transaction's log records that do not include a transaction confirmation log record. The unload program may examine the third transaction log records, calculate the elapsed time of the third transaction, and compare the elapsed time to a transaction time limit. In step 420, the unload program may assume that a transaction having transaction log records that do not have an accompanying confirmation log record, and for which the transaction elapsed time has exceeded the transaction time limit, has been aborted. Finding that the third transaction has exceeded the transaction time limit, the unload program may write the third transaction log records to a disposal file for aborted transaction log records in step 429. The unload program may write the transaction log records of transactions that have not exceeded the transaction time limit to a suspended file for uncompleted transaction log records in step 430. In step 431, the unload program finishes the unload of the log file and suspended file.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method comprising:

providing a transaction time limit for transactions, wherein the transaction time limit indicates a time by which a transaction must complete to be valid;

providing a current time;

writing a first transaction to a log file;

completing the first transaction;

writing a completion record for the first transaction to the log file, wherein the completion record indicates that the first transaction has completed;

writing the completed first transaction to a completed transaction file;

writing a second transaction to the log file;

reading the second transaction from the log;

writing the second transaction to an uncompleted transaction file;

completing the second transaction;

writing a completion record for the second transaction to the log file, wherein the completion record indicates that the second transaction has completed;

reading the contents of the log file and contents of the uncompleted transaction file, wherein the contents of the log file include the completion record for the second transaction and wherein the contents of the uncompleted transaction file include the second transaction;

determining that the second transaction from the uncompleted transaction file corresponds to the completion record for the second transaction from the log file and writing the completed second transaction to the completed transaction file in response to determining that the second transaction from the uncompleted transaction file corresponds to the completion record for the second transaction from the log file;

reading the contents of the log file and contents of the uncompleted transaction file;

writing a third transition to a log file, wherein the third transaction includes a transition start time, wherein the transaction start time indicates a time at which the third transaction began; and writing the third transaction to an aborted transaction file when the transaction elapsed time of the third transaction has exceeded the transaction time limit.

2. The method of claim 1, wherein writing the third transaction to an aborted transaction file comprises, calculating a transaction elapsed time for the third transaction by subtracting the current time from the transaction start time;

comparing the transaction elapsed time of the third transaction to the transaction time limit.

3. The method of claim 1, wherein at least one transaction comprises at least one transaction record, and wherein a transaction record comprises at least one field.

4. The method of claim 1, wherein at least one transaction record further comprises an identifier field, wherein the identifier field is unique to the transaction, such that the identifier field uniquely identifies a transaction record as belonging to a particular transaction, and such that the identifier field is used to distinguish the particular transaction from other transactions.

5. The method of claim 1, wherein at least one transaction record further comprises a time field, wherein the time field comprises a time stamp.

6. The method of claim 1, wherein the identifier field is the time field, wherein the time stamp is a time at which the transaction was started.

7. The method of claim 1, wherein one transaction record is a completion record comprising a time field and a transaction complete field, wherein the transaction complete field includes information identifying a record as a completion record.

8. The method of claim 1, wherein at least one transaction includes a program identifier, wherein the program identifier is a unique piece of data that indicates which program of a plurality of programs generated the transaction.

9. The method of claim 1, wherein a logger interface program is configured to accept transactions generated by programs and send the transactions to a system logger.

10. The method of claim 9, wherein the system logger is a component of an operating system.

11. The method of claim 9, further comprising, the logger interface program receiving the first transaction from a first program;

the logger interface program sending the first transaction to the system logger;

the logger interface program receiving the second transaction from a second program; and the logger interface program sending the second transaction to the system logger.

12. The method of claim 9, wherein the logger interface program is executable by a mainframe computer system.

13. The method of claim 1, wherein reading transactions from the log file further comprises a logger unload program reading transactions from the log file;

wherein writing the completed first transaction to a completed transaction file further comprises the logger unload program writing the completed first transaction to a completed transaction file; and wherein writing the second transaction to an uncompleted transaction file further comprises the logger unload program writing the second transaction to an uncompleted transaction file.

14. The method of claim 13, further comprising:

completing the second transaction;

writing a completion record for the second transaction to the log file, wherein the completion record indicates that the second transaction has completed;

the logger unload program reading contents of the log file and contents of the uncompleted transaction file;

the logger unload program determining that the second transaction from the uncompleted transaction file corresponds to the completion record for the second transaction from the log file; and the logger unload program writing the completed second transaction to the completed transaction file in response to the logger unload program determining that the second transaction from the uncompleted transaction file corresponds to the completion record for the second transaction from the log file.

15. The method of claim 14, further comprising:

the logger unload program reading contents of the log file mid contents of the uncompleted transaction file;

the logger unload program calculating a transaction elapsed time for the third transaction by subtracting the current time from the transaction start time;

the logger unload program comparing the transaction elapsed time of the third transaction to the transaction time limit; and the logger unload program writing the third transaction to an aborted transaction file when the transaction elapsed time of the third transaction has exceeded the transaction time limit.

16. A method for logging transactions in a computer systems the method comprising;

providing a transaction time limit for transactions, wherein the transaction time limit indicates a time by which the transaction must complete to be valid;

providing a current time;

starting a first transaction;

writing a first record for the first transaction to a log file;

starting a second transaction;

writing a first record of the second transaction to the log file;

starting a third transaction;

writing a first record of the third transaction to the log file;

completing the first transaction;

writing a completion record for the first transaction to the log file, wherein the completion record indicates that the first transaction has completed;

reading the first record for the first transaction, the first record for the second transaction, the first record for the third transaction and the completion record for the first transaction from the log file;

writing the completed first transaction to a completed transaction file;

writing the second transaction and the third transaction to an uncompleted transaction file;

completing the second transaction;

writing a completion record for the second transaction to the log file, wherein the completion record indicates that the second transaction has completed aborting the third transaction;

reading the contents of the log file and contents of the uncompleted transaction file;

determining that the second transaction from the uncompleted transaction file corresponds to the completion record for the second transaction from the log file;

writing the completed second transaction to the completed transaction file in response to determining that the second transaction from the uncompleted transaction file corresponds to the completion record for the second transaction from the log file;

calculating a transaction elapsed time for the third transaction by subtracting a time stamp of the first record of the third transaction from the current time;

comparing the transaction elapsed lime of the third transaction to the transaction time limit; and writing the third transaction to an aborted transaction file when the transaction elapsed time of the third transaction has exceeded the transaction time limits.

17. A carrier medium comprising program instructions, wherein the program instructions are executable by a machine to implement:

providing a transaction time limit for transactions, wherein the transaction time limit indicates a time by which the transaction must complete to be valid;

providing a current time;

writing a first transaction to a log file;

writing a second transaction to the log file, writing a third transaction to the log file; wherein the third transaction includes a transaction start time, wherein the transaction start time indicates a time at which the third transaction began;

completing the first transaction;

writing a completion record for the first transaction to the log file, wherein the completion record indicates that the first transaction has completed;

reading the completed first transaction from the log file;

reading the second transaction from the log file;

writing the completed first transaction to a completed transaction file;

writing the second transaction to an uncompleted transaction file;

completing the second transaction;

writing a completion record for the second transaction to the log file, wherein the completion record indicates that the second transaction has completed;

reading contents of the log file and contents of the uncompleted transaction file;

determining that the second transaction from the uncompleted transaction file corresponds to the completion record for the second transaction from the log file;

writing the completed second transaction to the completed transaction file in response to determining that the second transaction from the uncompleted transaction file corresponds to the completion record for the second transaction from the log file;

reading the contents of the log file and contents of the uncompleted transaction file;

calculating a transaction elapsed time for the third transaction by subtracting a time stamp of the first record of the third transaction from the current time, comparing the transaction elapsed time of the third transaction to the transaction time limit.

writing the third transaction to an aborted transaction file when the transaction elapsed time of third transaction exceeds the transaction time limit.

18. The carrier medium of claim 17, wherein at least one transaction comprises at least one transaction record, and wherein a transaction record comprises at least one field.

19. The carrier medium of claim 17, wherein at least one transaction record further comprises all identifier field, and wherein the identifier field is unique to the transaction, such that the identifier field uniquely identifies a transaction record as belonging to a particular transaction, and such that the identifier field is used to distinguish the particular transaction from other transactions.

20. The carrier medium o[0086] claim 19, wherein the identifier field is the time field, wherein the time stamp is a time at which the transaction was started.

21. The carrier medium of claim 20, wherein one transaction record is a completion record comprising a time field and a transaction complete field, wherein the transaction complete field includes information identifying a record as a completion record.

22. The carrier medium of claim 17, wherein at least one transaction record further comprises a time field, wherein the time field comprises a time stamp.

23. The carrier medium of claim 17, wherein at least one transaction includes a program identifier, wherein the program identifier is a unique piece of data that indicates which program of a plurality of programs generated the transaction.

24. The carrier medium of claim 23, wherein a logger interface program is configured to accept transactions generated by programs and send the transactions to a system logger.

25. The carrier medium of claim 24, wherein the system logger is a component of an operating system.

26. The carrier medium of claim 24, wherein the program instructions are further executable by the machine to implement:
   the logger interface program receiving the first transaction from a first program;
   the logger interface program sending the first transaction to the system logger;
   the logger interface program receiving the second transaction from a second program;
   the logger interface program sending the second transaction to the system logger.

27. The carrier medium of claim 17, wherein the machine is a mainframe computer system.

28. The carrier medium of claim 17,
   wherein reading transactions from the log file comprises a logger unload program executable for reading transactions from the log file;
   wherein writing the completed first transaction to a completed transaction file comprises the logger unload program executable for writing the completed first transaction to a completed transaction file; and
   wherein writing the second transaction to an uncompleted transaction file comprises the logger unload program executable for writing the second transaction to an uncompleted transaction file.

29. The carrier medium of claim 28, wherein the program instructions are further executable by the machine to implement:
   writing a completion record for the second transaction to the log file, wherein the completion record indicates that the second transaction has completed;
   the logger unload program reading contents of the log file and contents of the uncompleted transaction file;
   the logger unload program determining that the second transaction from the uncompleted transaction file corresponds to the completion record for the second transaction from the log file; and
   the logger unload program writing the completed second transaction to the completed transaction file in response to the logger unload program determining that the second transaction from the uncompleted transaction file corresponds to the completion record for the second transaction from the log file.

30. The carrier medium of claim 28, wherein the program instructions are further executable by the machine to implement:
   providing a transaction time limit for transactions, wherein the transaction time limit indicates a time by which the transaction must complete to be valid;
   providing a current time;
   writing a third transaction to the log file, wherein the third transaction includes a transaction start time) wherein the transaction start time indicates a time at which the third transaction began;
   the logger unload program reading contents of the log file and contents of the uncompleted transaction file;
   the logger unload program calculating a transaction elapsed time for the third transaction by subtracting the current time from the transaction start time,
   the logger unload program comparing the transaction elapsed time of the third transaction to the transaction time limit; and
   the logger unload program writing the third transaction to an aborted transaction file when the transaction elapsed time of the third transaction has exceeded tile transaction time limit.

31. The carrier medium of claim 17, wherein the carrier medium is a memory medium.

32. A system comprising,
   a processing unit;
   a system clock coupled to the processing unit;
   a system memory coupled to the processing unit;
   a data storage coupled to the processing unit;
   wherein the system memory stores program instructions, wherein the program instructions are executable by the processing unit to:
      write a First transaction to a log file in the data storage;
      write a completion record for the first transaction to the log file, wherein the completion record indicates that the first transaction has completed;
      write a second transaction to the log file;
      read the completed first transaction from the log file;
      read the second transaction from the log file;
      write the completed first transaction to a completed transaction file in the data storage;
      write the second transaction to an uncompleted transaction file in the data storage;
      complete the second transaction;
      write a completion record for the second transaction to the log file, wherein the completion record indicates that the second transaction has completed;
      read the contents of the log file and contents of the uncompleted transaction file, wherein the contents of the log file include the completion record for the second transaction, and wherein the contents of the uncompleted transaction file include the second transaction;
      determine that the second transaction from die uncompleted transaction file corresponds to the completion record for the second transaction front the log file;
      write the completed second transaction to the completed transaction file in response to determining that the second transaction from the uncompleted transaction file corresponds to the completion record for the second transaction from the log file;
      provide a transaction time limit for transactions, wherein the transaction time limit indicates a time by which the transaction must complete to be valid;
      determine a current time by reading the system clock;
      write the third transaction to the log files wherein the third transaction includes a transaction start time, wherein the transaction start time indicates a time at which the third transaction began; read the contents of the log file and contents of the uncompleted transaction file;
      calculate a transaction elapsed time for the third transaction by subtracting the current time from the transaction start time;
      compare the transaction elapsed time of the third transaction to the transaction time limit; and
      write the third transaction to an aborted transaction file when the transaction elapsed time of the third transaction has exceeded the transaction time limit.

33. The system of claim 32, wherein at least one transaction comprises at least one transaction record, and wherein a transaction record comprises at least one field.

34. The system of claim 32, wherein at least one transaction record further comprises an identifier field, and wherein the identifier field is unique to the transaction, such that the identifier field uniquely identifies a transaction record as belonging to a particular transaction, and such that the identifier field is used to distinguish the particular transaction from other transactions.

35. The system of claim 32, wherein at least one transaction record further comprises a time field, and wherein the time field comprises a time stamp.

36. The system of claim 32, wherein the identifier field is the time field, and wherein the time stamp is a time at which the transaction was started.

37. The system of claim 32, wherein one transaction record is a completion record comprising a time field and a transaction complete field, wherein the transaction complete field includes information identifying a record as a completion record.

38. The system of claim 32, wherein at least one transaction includes a program identifier, wherein the program identifier is a unique piece of data that indicates which program of a plurality of programs generated the transaction.

39. The system of claim 38, wherein a logger interface program is configured to accept transactions generated by programs and send transactions to a system logger.

40. The system of claim 39, wherein the system logger is a component of an operating system.

41. The system of claim 39,
wherein the program instructions further comprise a first application program and a second application program;
wherein the logger interface program is executable to receive the first transaction from a first program;
wherein the logger interface program is executable to send the first transaction to the system logger;
wherein the logger interface program is executable to receive the second transaction from a second program;
wherein the logger interface program is executable to send the second transaction to the system logger;
wherein the system logger is executable to write the first transaction to the log file and write the second transaction to the log file.

42. A carrier medium comprising program instructions, wherein the program instructions are executable by a machine to implement:
providing a transaction time limit for transactions, wherein the transaction time limit indicates a time by which the transaction must complete to be valid;
providing a current time;
starting a first transaction;
writing a first record for the first transaction to a log file;
starting a second transaction;
writing a first record for the second transaction to the log file;
starting a third transaction;
writing a first record for the third transaction;
completing the first transaction;
writing a completion record for the first transaction to the log file, wherein the completion record indicates that the first transaction has completed;
reading the first record for the first transaction, the first record for the second transaction, the first record for the third transaction and the completion record for the first transaction from the log file;
writing the completed first transaction to a completed transaction file;
writing the second transaction and the third transaction to an uncompleted transaction file;
completing the second transaction;
writing a completion record for the second transaction to the log file, wherein the completion record indicates that the second transaction has completed;
reading contents of the log file and contents of the uncompleted transaction file;
determining that the second transaction from the uncompleted transaction file corresponds to the completion record for the second transaction from the log file;
writing the completed second transaction to the completed transaction file in response to determining that the second transaction from the uncompleted transaction file corresponds to the completion record for the second transaction from the log file,
calculating a transaction elapsed time for the third transaction by subtracting a time stamp of the first record of the third transaction from the current time;
comparing the transaction elapsed time of the third transaction to the transaction time limit, writing the third transaction to an aborted transaction file when the transaction elapsed time of third transaction exceeds the transaction time limit.

43. The carrier medium of claim 42, wherein the carrier is a memory medium.

* * * * *

UNITED STATES PATENT AND TRADEMARK OFFICE
CERTIFICATE OF CORRECTION

PATENT NO.    : 6,446,086 B1
DATED         : September 3, 2002
INVENTOR(S)   : Bartlett et al.

It is certified that error appears in the above-identified patent and that said Letters Patent is hereby corrected as shown below:

<u>Column 16,</u>
Line 41, please delete "all" and substitute therefor -- an --.
Line 47, please delete "o[0086]" and substitute therefor -- of --.

Signed and Sealed this

Seventeenth Day of December, 2002

JAMES E. ROGAN
*Director of the United States Patent and Trademark Office*